United States Patent
Hayakawa (10) Patent No.: US 10,461,798 B2
(45) Date of Patent: *Oct. 29, 2019

(54) HIGH-FREQUENCY MODULE

(71) Applicant: Murata Manufacturing Co., Ltd., Nagaokakyo-shi, Kyoto-fu (JP)

(72) Inventor: Masashi Hayakawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,648

(22) Filed: May 31, 2018

(65) Prior Publication Data

US 2019/0140685 A1    May 9, 2019

Related U.S. Application Data

(63) Continuation of application No. 15/643,629, filed on Jul. 7, 2017, now Pat. No. 10,014,902, which is a (Continued)

(30) Foreign Application Priority Data

Jan. 29, 2015  (JP) .................................. 2015-015781

(51) Int. Cl.
    *H04B 1/44*    (2006.01)
    *H04B 1/04*    (2006.01)
(52) U.S. Cl.
    CPC ................. *H04B 1/44* (2013.01); *H04B 1/04* (2013.01)

(58) Field of Classification Search
    CPC ...... H04B 1/04; H04B 1/0458; H04B 1/0475; H04B 1/18; H04B 1/44; H04B 1/48; H04B 1/406; H04B 2001/0408
    (Continued)

(56) References Cited

U.S. PATENT DOCUMENTS 6,995,630 B2 *  2/2006  Satoh ........................ H04B 1/48
                                                    455/552.1
7,023,258 B2 *  4/2006  Hamase ............... H03K 17/693
                                                     327/308
(Continued)

FOREIGN PATENT DOCUMENTS

CN          201215824 Y       4/2009
CN          102903994 A       1/2013
(Continued)

OTHER PUBLICATIONS

Hayakawa, "High-Frequency Module", U.S. Appl. No. 15/643,629, filed Jul. 7, 2017.
(Continued)

*Primary Examiner* — Quochien B Vuong
(74) *Attorney, Agent, or Firm* — Keating & Bennett, LLP (57) ABSTRACT

A high-frequency module includes a directivity switching switch unit that switches an end portion of a first sub line, which is connected to an output terminal, and first and second resistor switching switch units that switch first and second termination resistors which are connected to the first sub line. The directivity of coupled output in the first sub line of a first directional coupler is able to be switched and detection accuracy of a high-frequency signal is able to be improved by improving isolation characteristics of the first directional coupler to improve the directivity.

20 Claims, 8 Drawing Sheets

Related U.S. Application Data continuation of application No. PCT/JP2016/050456, filed on Jan. 8, 2016.

(58) Field of Classification Search
USPC .............................. 455/78, 82, 552.1, 553.1
See application file for complete search history.

(56) References Cited

U.S. PATENT DOCUMENTS

| | | | |
|---|---|---|---|
| 9,178,264 B2* | 11/2015 | Kuwajima | ................ H01P 5/18 |
| 9,451,690 B2* | 9/2016 | Saji | ...................... H05K 1/0243 |
| 2001/0010483 A1* | 8/2001 | Akiya | ................... H03F 1/0261 |
| | | | 330/298 |
| 2013/0027273 A1 | 1/2013 | Kuwajima et al. | |
| 2016/0079650 A1 | 3/2016 | Solomko et al. | |
| 2016/0172737 A1 | 6/2016 | Srirattana et al. | |

FOREIGN PATENT DOCUMENTS

| | | |
|---|---|---|
| CN | 105428773 A | 3/2016 |
| CN | 107210507 A | 9/2017 |

OTHER PUBLICATIONS

Official Communication issued in Chinese Patent Application No. 201680007807.5, dated Nov. 2, 2018.

* cited by examiner

HIGH-FREQUENCY MODULE

CROSS REFERENCE TO RELATED APPLICATIONS

This application claims the benefit of priority to Japanese Patent Application No. 2015-015781 filed on Jan. 29, 2015 and is a Continuation Application of PCT Application No. PCT/JP2016/050456 filed on Jan. 8, 2016. The entire contents of each application are hereby incorporated herein by reference.

BACKGROUND OF THE INVENTION

1. Field of the Invention

The present invention relates to a high-frequency module including a directional coupler to detect a high-frequency signal transmitted through a signal path.

2. Description of the Related Art

Figure 12:
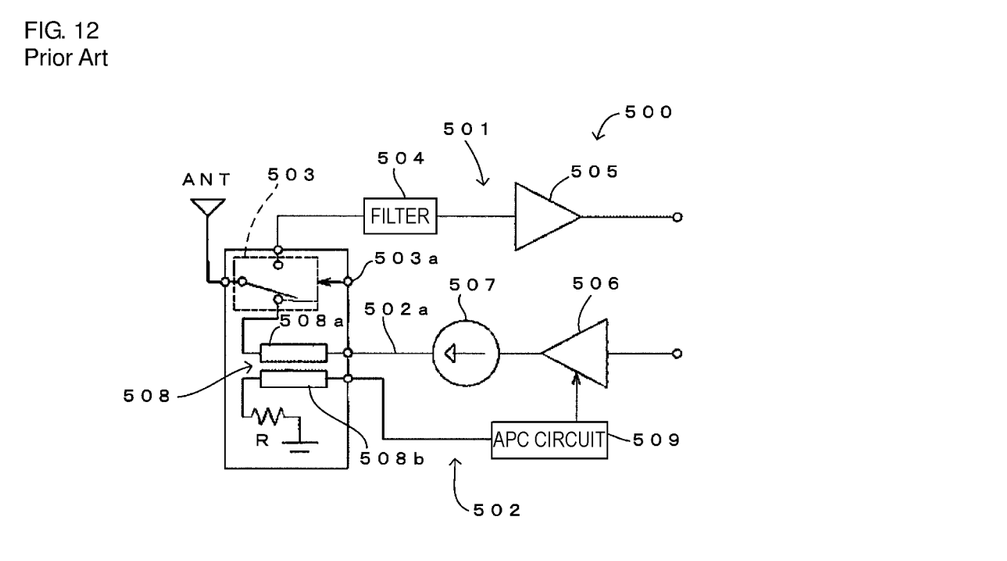
FIG. 12 is a view illustrating a high-frequency circuit included in an existing high-frequency module.

An existing high-frequency circuit 500 illustrated in FIG. 12 includes a switch circuit 503 connecting an antenna ANT and one of a reception circuit 501 and a transmission circuit 502 in a switching manner, and a connection state of the switch circuit 503 is controlled to be switched based on a control signal that is input to a control terminal 503a. When the antenna ANT and the reception circuit 501 are connected, a reception signal input to the antenna ANT passes through a filter 504 and is input to a low noise amplifier 505. When the antenna ANT and the transmission circuit 502 are connected, a transmission signal output from a power amplifier 506 passes through an isolator 507 and is output from the antenna ANT.

In the high-frequency circuit 500, a directional coupler 508 including a main line 508a located in a signal path 502a through which the transmission signal passes is provided, a termination resistor R is connected to an end portion (port), at the isolation side, of a sub line 508b that is electromagnetically coupled to the main line 508a, and an automatic power control (APC) circuit 509 is connected to an end portion (port) thereof at a coupling side. The gain of the power amplifier 506 is adjusted based on a control signal for gain adjustment, which is output from the APC circuit 509 in accordance with the signal level of the transmission signal detected by the directional coupler 508, such that the signal level of the transmission signal to be output from the power amplifier 506 is substantially constant.

In recent years, as communication apparatuses including mobile communication terminals, such as cellular phones and portable information terminals, and wireless LAN terminals, and the like, a communication apparatus that includes a plurality of communication systems for making communication based on different communication standards, such as GSM (Global System for Mobile Communications, registered trademark) standards, W-CDMA (Wideband Code Division Multiple Access) standards, LTE (Long Term Evolution) standards, and Bluetooth (registered trademark) standards and is compatible with communication based on a plurality of communication standards (multiple modes) has been provided. In the communication apparatus that includes the plurality of communication systems and is therefore compatible with the multiple modes, predetermined frequency bands are assigned to the respective communication systems and communication is performed using the plurality of frequency bands (multiple bands). As the communication apparatus that is compatible with the multiple modes as described above, a communication apparatus including a communication system for receiving signals from GPS (Global Positioning System) satellite in addition to the respective communication systems for making communication based on the above-described communication standards has been also provided.

The communication apparatus that is compatible with the multiple modes and multiple bands uses a plurality of multiband antennas to improve quality and reliability of communication and improve communication speed. For example, the same reception signal is received using a plurality of multiband antennas with a diversity system. Then, the plurality of same reception signals received by the respective multiband antennas are compared and communication is performed using the multiband antenna which is the best in a reception state among the multiband antennas or the plurality of same reception signals received by the plurality of multiband antennas are combined to remove noise contained in the reception signals, thereby improving the quality and reliability of communication.

For example, communication is performed using a plurality of multiband antennas to which different frequency bands are respectively assigned with a carrier aggregation system. That is to say, the plurality of multiband antennas are used for communication and the respective frequency bands are combined to be simultaneously used, thereby improving communication volume.

In the communication apparatus including the plurality of communication systems and employing a communication method, such as the diversity system and the carrier aggregation system, the high-frequency circuit 500 is required to have a function of causing the directional coupler 508 to detect, with high accuracy, transmission signals of the plurality of frequency bands, which are output from the respective communication systems, and high-frequency signals of the plurality of frequency bands, which are returned after the transmission signals are reflected by the antenna ANT, in order to further improve transfer characteristics of the transmission signals of predetermined frequency bands of the respective communication systems and suppress reflection and flow-in of the transmission signals of the predetermined frequency bands to the transmission circuit 502 side due to mismatching in the antenna ANT.

SUMMARY OF THE INVENTION

Preferred embodiments of the present invention provide techniques that are capable of switching the directivity of coupled output of a directional coupler and improving detection accuracy of a high-frequency signal by improving isolation characteristics.

A high-frequency module according to a preferred embodiment of the present invention includes a first directional coupler including a first main line located in a first signal path of a high-frequency circuit and a first sub line which is electromagnetically coupled to the first main line; and a switch unit that switches directivity of coupled output in the first sub line, wherein the switch unit includes a first input terminal which is connected to one end portion of the first sub line; a second input terminal which is connected to the other end portion of the first sub line; an output terminal from which the coupled output input to the first input terminal or the second input terminal in the first sub line is output; a plurality of first resistor switching terminals to which a plurality of first termination resistors with different resistance values are connected in a one-to-one correspondence manner; a plurality of second resistor switching terminals to which a plurality of second termination resistors with different resistance values are connected in a one-to-one correspondence manner; a directivity switching switch unit which connects one of the first input terminal and the second input terminal and the output terminal in a switching manner; the plurality of first termination resistors which are connected to the first input terminal in parallel; the plurality of second termination resistors which are connected to the second input terminal in parallel; a first resistor switching switch unit which connects at least one of the first termination resistors to the first input terminal when the directivity switching switch unit connects the second input terminal to the output terminal; and a second resistor switching switch unit which connects at least one of the second termination resistors to the second input terminal when the directivity switching switch unit connects the first input terminal to the output terminal.

In a high-frequency module according to a preferred embodiment of the present invention, the first resistor switching switch unit connects at least one of the plurality of first termination resistors to the first input terminal (one end portion of the sub line) when the directivity switching switch unit connects the second input terminal (the other end portion of the first sub line) to the output terminal. When the directivity switching switch unit connects the first input terminal (one end portion of the sub line) to the output terminal, the second resistor switching switch unit connects at least one of the plurality of second termination resistors to the second input terminal (the other end portion of the sub line). With these, the directivity of the coupled output in the first sub line of the first directional coupler is able to be switched.

In a high-frequency module according to a preferred embodiment of the present invention, when the coupled output in the first sub line is input to the second input terminal from the other end portion, the first termination resistor with an optimum resistance value is connected to the one end portion of the sub line with the first input terminal interposed therebetween in accordance with a frequency band of a high-frequency signal as a detection target, the high-frequency circuit that is connected to the first main line, and the fluctuation of load, and in the same or similar manner when the coupled output in the first sub line is input to the first input terminal from the one end portion, the second termination resistor with an optimum resistance value is connected to the other end portion of the sub line with the second input terminal interposed therebetween. With this configuration, the directivity is able to be improved by eliminating mismatching caused by fluctuation in the frequency of the coupled output, and the like and improving the isolation characteristics of the first directional coupler, thus improving the detection accuracy of the high-frequency signal.

Furthermore, the switch unit may preferably further include a first inductor which is connected between the first input terminal and the output terminal; and a second inductor which is connected between the second input terminal and the output terminal.

With this configuration, when the coupled output in the first sub line is input to the second input terminal from the other end portion, the first inductor and off capacitance of the directivity switching switch unit define an LC parallel resonance circuit between the first input terminal and the output terminal. By setting the inductance of the first inductor such that the resonant frequency of the LC parallel resonance circuit is a frequency at which isolation characteristics are desired to be improved, the isolation characteristics between the first input terminal and the output terminal at a frequency of a signal that is input to the second input terminal is able to be improved. When the coupled output in the first sub line is input to the first input terminal from the one end portion, the second inductor and the off capacitance of the directivity switching switch unit define an LC parallel resonance circuit between the second input terminal and the output terminal. By setting the inductance of the second inductor in the same or similar manner as for the first inductor, the isolation characteristics between the second input terminal and the output terminal at a frequency of a signal that is input to the first input terminal are able to be improved.

The switch unit may preferably further include a capacitor which is connected between the first input terminal and the second input terminal.

With this configuration, a parasitic inductance component in the first sub line and the capacitor define an LC parallel resonance circuit between the first input terminal and the second input terminal. By setting the shape of the first sub line, such as the line length and the width thereof, and the capacitance of the capacitor such that the resonant frequency of the LC parallel resonance circuit is a frequency at which isolation characteristics are desired to be improved, the isolation characteristics between the first input terminal and the second input terminal at a desired frequency are able to be improved.

A high-frequency module according to a preferred embodiment of the present invention may preferably include a multilayer substrate including a laminate of a plurality of insulating layers and in which the first directional coupler and the switch unit are provided, wherein the switch unit includes a switch IC component mounted on the multilayer substrate, and the first termination resistors and the second termination resistors are provided in the switch IC component.

With this configuration, a circuit to switch the directivity of the first directional coupler is able to be easily formed only by mounting the switch IC component on the multilayer substrate.

Furthermore, a high-frequency module according to a preferred embodiment of the present invention may preferably include a multilayer substrate including a laminate of a plurality of insulating layers and in which the first directional coupler and the switch unit are provided, wherein the switch unit includes a switch IC component mounted on the multilayer substrate, and the first termination resistors and the second termination resistors are respectively defined by chip components mounted on the multilayer substrate.

With this configuration, a circuit to switch the directivity of the first directional coupler is able to be provided with a practical configuration by the switch IC component and the chip components. In addition, the resistance values are able to be easily changed only by replacing the chip components defining the first and second termination resistors, so as to increase the degree of freedom in design of the resistance values.

Furthermore, it is preferable that a first connection wiring connecting the one end portion of the first sub line and the first input terminal and a second connection wiring connecting the other end portion of the first sub line and the second input terminal be provided on or in insulating layers which are different from each other.

With this configuration, electromagnetic coupling between the first connection wiring and the second connection wiring is able to be reduced or prevented, so as to improve the isolation characteristics between the first input terminal and the second input terminal.

Furthermore, the first directional coupler may preferably be defined by a surface mount device mounted on the multilayer substrate.

With this configuration, the first directional coupler is able to be connected to the high-frequency circuit only by mounting the surface mount device on the multilayer substrate.

It is preferable that a high-frequency module according to a preferred embodiment of the present invention further includes a second directional coupler including a second main line located in a second signal path and a second sub line which is electromagnetically coupled to the second main line, wherein the switch unit includes a third input terminal which is connected to one end portion of the second sub line; a fourth input terminal which is connected to the other end portion of the second sub line; a plurality of third termination resistors which are connected to the third input terminal in parallel; and a plurality of fourth termination resistors which are connected to the fourth input terminal in parallel, the directivity switching switch unit connects any one of the first to fourth input terminals and the output terminal in a switching manner, the switch unit further includes a third resistor switching switch unit which connects at least one of the third termination resistors to the third input terminal when the directivity switching switch unit connects the fourth input terminal to the output terminal; and a fourth resistor switching switch unit which connects at least one of the fourth termination resistors to the fourth input terminal when the directivity switching switch unit connects the third input terminal to the output terminal, and the switch unit selectively switches directivity of coupled output in any one of the first sub line and the second sub line.

This configuration is practical because the first and second directional couplers provided in the first and second main lines, respectively, are able to detect high-frequency signals passing through the first and second main lines in both directions.

According to various preferred embodiments of the present invention, a directivity switching switch unit switches an end portion of a first sub line that is connected to an output terminal and first and second resistor switching switch units switch first and second termination resistors that are connected to the first sub line. With this configuration, directivity of coupled output in the first sub line of a first directional coupler is able to be switched, and detection accuracy of the high-frequency signal is able to be improved by improving isolation characteristics of the first directional coupler to improve the directivity.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are graphs illustrating bandpass characteristics of the circuit in FIG. 3, where

FIGS. 6A and 6B are graphs illustrating bandpass characteristics of the circuit in FIG. 5, where

FIGS. 8A and 8B are graphs illustrating bandpass characteristics of the circuit in FIG. 7, where

FIGS. 10A and 10B are graphs illustrating bandpass characteristics of the circuit in FIG. 9, where

DETAILED DESCRIPTION OF THE PREFERRED EMBODIMENTS

First Preferred Embodiment

Figure 1:
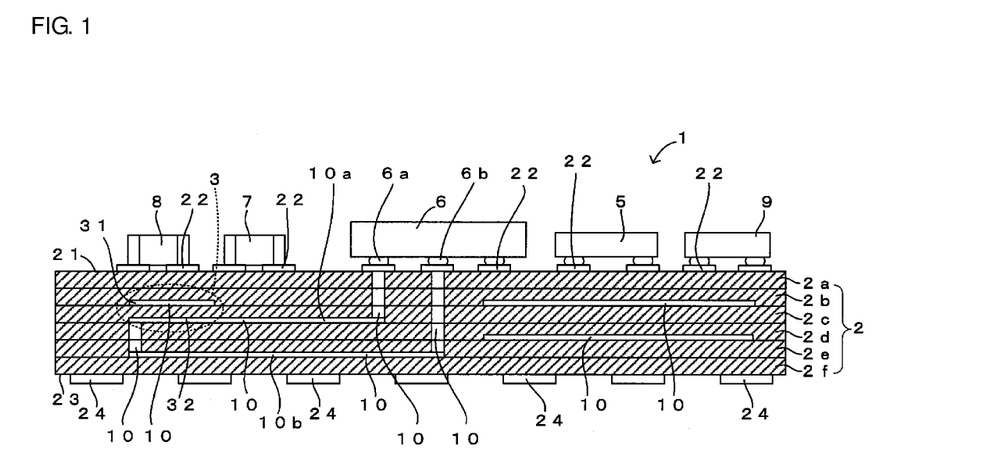
FIG. 1 is a cross-sectional view illustrating a high-frequency module according to a first preferred embodiment of the present invention.
Figure 2:
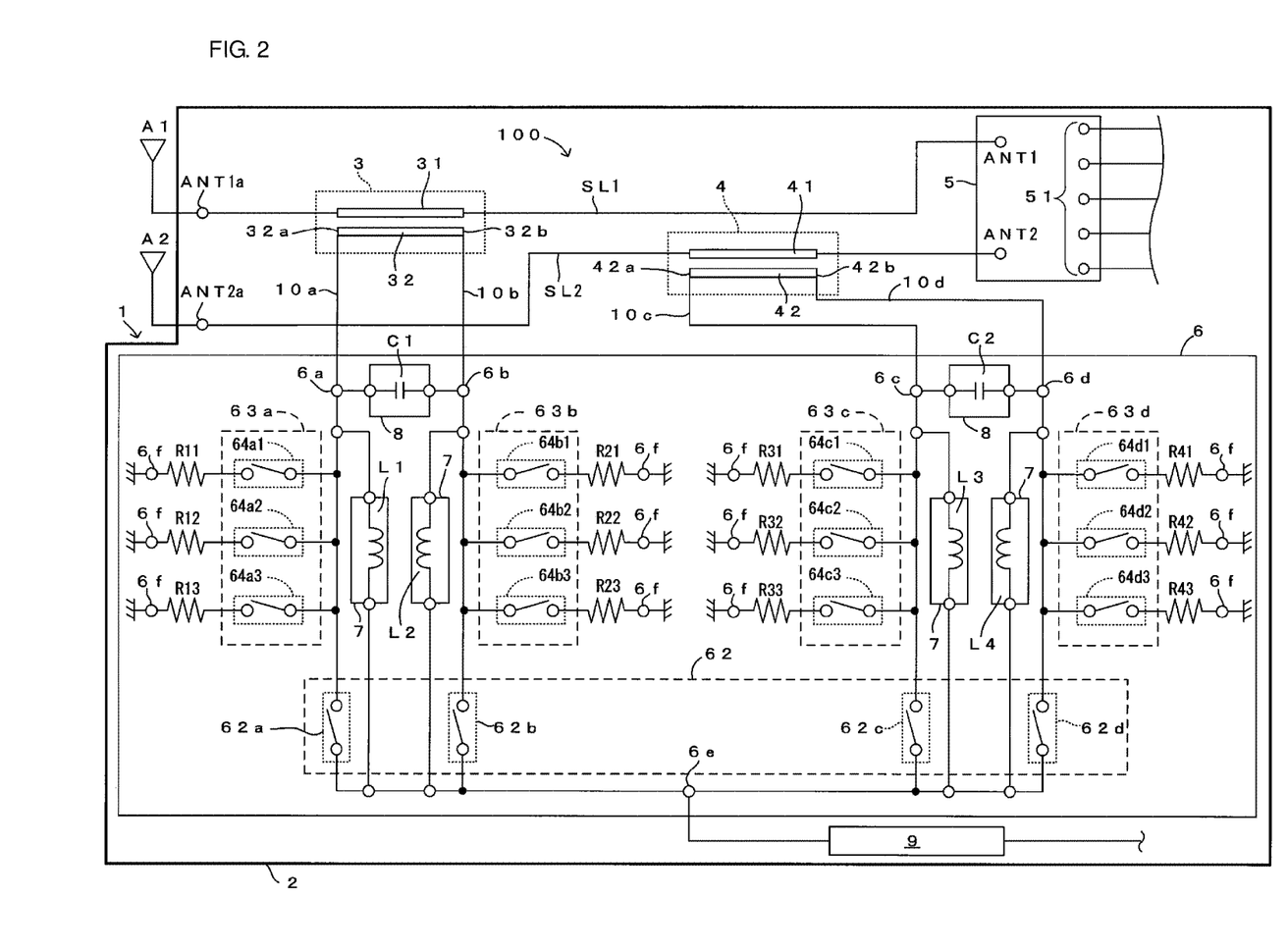
FIG. 2 is a diagram illustrating a high-frequency circuit included in the high-frequency module in FIG. 1.
Figure 11:
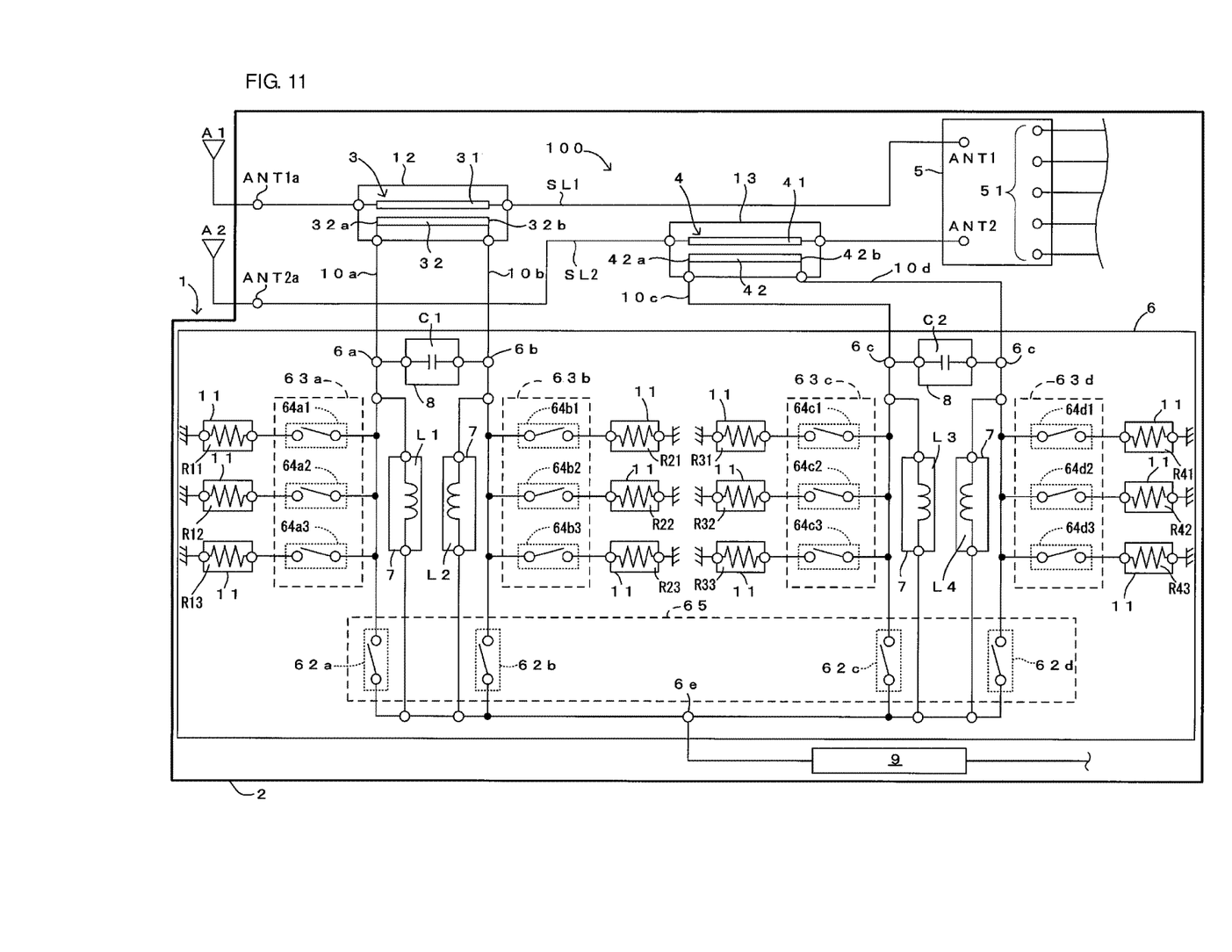
FIG. 11 is a view illustrating a high-frequency circuit included in a high-frequency module according to a second preferred embodiment of the present invention.

A first preferred embodiment of the present invention will be described with reference to FIG. 1 to FIG. 10. FIG. 1 and FIG. 2 illustrate only main configurations according to preferred embodiments of the present invention and other configurations are not illustrated in the drawings for making explanation easy. FIG. 11 to be referred to later in the description also illustrates only main configurations as in FIG. 2 but explanation thereof is omitted in the following description.

A high-frequency module 1 illustrated in FIG. 1 and FIG. 2 is mounted on a communication apparatus (not illustrated) which makes communication using a plurality of frequency bands based on a plurality of communication standards and is compatible with multiple modes and multiple bands. The communication apparatus includes a plurality of communication systems to make communication based on different communication standards, such as GSM standards, W-CDMA standards, LTE standards, and Bluetooth standards, and a plurality of communication systems to make communication in different bands (frequency bands) based on the same communication standards. The high-frequency module 1 connects a plurality of antennas A1 and A2 provided in the communication apparatus and the plurality of communication systems (not illustrated) mounted on the communication apparatus in a switching manner. The high-frequency module 1 is located at a subsequent stage to the antennas A1 and A2 that are capable of transmitting and receiving communication signals of the plurality of frequency bands and compatible with the multiple bands.

The high-frequency module 1 includes first and second directional couplers 3 and 4, a switch IC 5, a switch IC component 6, chip components 7 defining first to fourth inductors L1 to L4, chip components 8 defining first and second capacitors C1 and C2, and an output control circuit (output control component) 9, and includes a multilayer substrate 2 including a plurality of (for example, five) insulating layers 2a to 2f that are laminated. The switch IC 5, the switch IC component 6, the chip components 7 and 8, and the output control circuit (output control component) 9 are mounted on land electrodes 22 that mount components, which are provided on a mounting surface 21 of the multilayer substrate 2, and are electrically connected to a plurality of outer connection terminals 24 provided on a back surface 23 of the multilayer substrate 2 with wiring electrodes 10 provided in the multilayer substrate 2 interposed therebetween.

The multilayer substrate 2 is preferably defined by a common multilayer substrate, such as a low-temperature co-fired ceramics (LTCC) multilayer substrate and a resin multilayer substrate made of glass epoxy resin, for example. The chip components 7 and 8 that adjust characteristics of the switch IC 5 and the switch IC component 6 and provide a matching circuit, and various filter circuits, are mounted on the multilayer substrate 2 as necessary. Electrodes, such as the land electrodes 22, the outer connection terminals 24, and the wiring electrodes 10 are preferably provided on and in the multilayer substrate 2 using a conductive material containing Cu, Ag, or other suitable material.

The wiring electrodes 10 include in-plane conductors and via conductors provided in the five insulating layers 2a to 2f as necessary, and the switch IC 5, the switch IC component 6, and the respective chip components 7 and 8 provided on the multilayer substrate 2 are electrically connected to one another with the wiring electrodes 10 to define first and second signal paths SL1 and SL2, first to fourth connection wirings 10a to 10d, and other circuit elements. Furthermore, the first and second directional couplers 3 and 4, and circuit elements, such as capacitors and inductors defining the matching circuit, and various filter circuits are appropriately defined by the wiring electrodes 10. It should be noted that the directional coupler 4 is not illustrated in FIG. 1.

The directional coupler 3 includes a first main line 31 and a first sub line 32. The first main line 31 is located in the first signal path SL1 connecting an antenna terminal ANT1a (outer connection terminal 24) to which the antenna A1 is connected and a first common terminal ANT1 of the switch IC 5. The first sub line 32 is electromagnetically coupled to the first main line 31. The first connection wiring 10a connects one end portion 32a of the first sub line 32 and a first input terminal 6a of the switch IC 6 and the second connection wiring 10b connects the other end portion 32b of the first sub line 32 and a second input terminal 6b of the switch IC 6. As illustrated in FIG. 1, the first and second connection wirings 10a and 10b are respectively provided on the different insulating layers 2d and 2f of the multilayer substrate 2.

The directional coupler 4 includes a second main line 41 and a second sub line 42. The second main line 41 is located in the second signal path SL2 connecting an antenna terminal ANT2a (outer connection terminal 24) to which the antenna A2 is connected and a second common terminal ANT2 of the switch IC 5. The second sub line 42 is electromagnetically coupled to the second main line 41. The third connection wiring 10c connects one end portion 42a of the second sub line 42 and a third input terminal 6c of the switch IC 6 and the fourth connection wiring 10d connects the other end portion 42b of the second sub line 42 and the fourth input terminal 6d of the switch IC 6. Although not illustrated in the drawings, in the same or similar manner as the first and second connection wirings 10a and 10b, the third and fourth connection wirings 10c and 10d are respectively provided on the different insulating layers of the multilayer substrate 2.

As illustrated in FIG. 2, the switch IC 5 includes the first and second common terminals ANT1 and ANT2 and a plurality of switching terminals 51. The first and second common terminals ANT1 and ANT2 are connected to the antenna terminals ANT1a and ANT2a provided in the multilayer substrate 2 with the first and second signal paths SL1 and SL2, respectively. The individual antennas A1 and A2 are connected to the common terminals ANT1 and ANT2, respectively, by connecting the individual antennas A1 and A2 to the antenna terminals ANT1a and ANT2a, respectively. Corresponding communication systems (not illustrated) are respectively connected to the switching terminals 51, and any one of the common terminals ANT1 and ANT2 and any one of the switching terminals 51 are connected to each other in a switching manner to select the antenna A1 or A2 that is used by each of the communication systems. The configuration of the switch IC 5 is well known and the specific configuration thereof is therefore omitted.

The switch IC 6 (corresponding to a "switch unit") switches the directivity of coupled output in each of the first sub line 32 of the directional coupler 3 and the second sub line 42 of the directional coupler 4, and includes the first to fourth input terminals 6a to 6d, the output terminal 6e, a directivity switching switch unit 62 connecting any one of the first to fourth input terminals 6a to 6d and the output terminal 6e in a switching manner, and first to fourth resistor switching switch units 63a to 63d.

Each of the first to fourth resistor switching switch units 63a to 63d includes a plurality of switches and a plurality of termination resistors with different resistance values are connected to the respective switches in a one-to-one correspondence manner. For example, the first resistor switching switch unit 63a includes first to third switch elements 64a1 to 64a3. First end portions of the switch elements 64a1 to 64a3 are connected to the first input terminal 6a and the second end portions thereof are respectively connected to one ends of a plurality of first termination resistors R11 to R13 with different resistance values. The second to fourth resistor switching switch units 63b to 63d also have the same or similar configurations as that of the first resistor switching switch unit and explanation of the detailed configurations thereof is omitted by applying equivalent reference numerals. It should be noted that the second ends of the first to fourth termination resistors are connected to ground connection electrodes of the multilayer substrate 2 with ground terminals 6f of the switch IC 6 interposed therebetween.

The directivity switching switch unit 62 includes switches 62a to 62d provided so as to correspond one to one to the first to fourth input terminals 6a to 6d. First ends of the switches 62a to 62d are respectively connected to the first to fourth input terminals to which they correspond and the second ends thereof are connected to the output terminal 6e. In the present preferred embodiment, the directivity switching switch unit 62 and the first to fourth resistor switching switch units 63a to 63d are defined by, if necessary, respectively connecting inductors, capacitors, and resistors to electric field effect transistors (FETs).

When the directivity switching switch unit 62 connects the second input terminal 6b to the output terminal 6e, the first resistor switching switch unit 63a connects any one of the first termination resistors R11 to R13 to the first input terminal 6a. When the directivity switching switch unit 62 connects the first input terminal 6a to the output terminal 6e, the second resistor switching switch unit 63b connects any one of the second termination resistors R21 to R23 to the second input terminal 6b. In this case, the coupled output in the first sub line 32 is output from the output terminal 6e.

When the directivity switching switch unit 62 connects the fourth input terminal 6d to the output terminal 6e, the third resistor switching switch unit 63c connects any one of the third termination resistors R31 to R33 to the third input terminal 6c. When the directivity switching switch unit 62 connects the third input terminal 6c to the output terminal 6e, the fourth resistor switching switch unit 63d connects any one of the fourth termination resistors R41 to R43 to the fourth input terminal 6d. In this case, the coupled output in the second sub line 42 is output from the output terminal 6e.

As described above, switching of the connection state in the directivity switching switch unit 62 and the first to fourth resistor switching switch units 63a to 63d causes the switch IC component 6 to selectively switch the directivity of the coupled output in either of the first sub line 32 or the second sub line 42.

As illustrated in FIG. 2, the first inductor L1 (for example, about 100 nH) is connected between the first input terminal 6a and the output terminal 6e, the second inductor L2 (for example, about 100 nH) is connected between the second input terminal 6b and the output terminal 6e, the third inductor L3 (for example, about 100 nH) is connected between the third input terminal 6c and the output terminal 6e, and the fourth inductor L4 (for example, about 100 nH) is connected between the fourth input terminal 6d and the output terminal 6e. Furthermore, the first to fourth inductors L1 to L4 are preferably respectively defined by the chip components 7 mounted on the multilayer substrate 2. Accordingly, the inductances of the first to fourth inductors L1 to L4 are able to be easily adjusted only by replacing the chip components 7, so as to change adjustment ranges of the inductances of the first to fourth inductors L1 to L4. In the same or similar manner as the first to fourth termination resistors, at least any one of the first to fourth inductors L1 to L4 may be provided in the switch IC 6.

Furthermore, as illustrated in FIG. 2, the first capacitor C1 (corresponding to a "capacitor" of, for example, about 0.3 pF) is connected between the first input terminal 6a and the second input terminal 6b and the second capacitor C2 (for example, about 0.3 pF) is connected between the third input terminal 6c and the fourth input terminal 6d. The first and second capacitors C1 and C2 are preferably respectively defined by the chip components mounted on the multilayer substrate 2. Accordingly, the capacitances of the first and second capacitors C1 and C2 are able to be easily adjusted only by replacing the chip components 8, so as to increase adjustment ranges of the capacitances of the first and second capacitors C1 and C2. In the same or similar manner as the first to fourth termination resistors R1 to R4, at least any one of the first and second capacitors C1 and C2 may be provided in the switch IC component 6.

As illustrated in FIG. 2, the output control circuit 9 is connected to the output terminal 6e of the switch IC 6. For example, a portion of a signal passing through the main line is able to be taken out from the sub line with less influence on the signal passing through the main line by, for example, setting an electromagnetic coupling quantity between the main line and the sub line in each of the first and second directional couplers 3 and 4 to approximately 20 dB. The signal taken out from the sub line is output from the output terminal 6e and a control signal for gain adjustment is output to a power amplifier or other suitable component connected to the switching terminals 51 of the switch IC 5 from the output control circuit 9 based on the output signal.

How the isolation characteristics between a path connecting the first input terminal 6a and the output terminal 6e of the switch IC 6 and a path connecting the second input terminal 6b and the output terminal 6e are improved by adding the first inductor L1 will be described with reference to FIG. 3 to FIG. 6B. The transverse axis in each of FIGS. 4A and 4B and FIGS. 6A and 6B indicates frequency (GHz) and the longitudinal axis therein indicates passage loss (dB). In each of FIGS. 4A and 4B and FIGS. 6A and 6B, the output terminal 6e corresponds to a first port, the input terminal 6a corresponds to a second port, and the input terminal 6b corresponds to a third port. Although the case in which the input terminal 6b is connected to the first sub line 32 of the first directional coupler 3 is described as an example, the same or similar effects as those which will be described below are also provided in the case in which any one of the input terminals 6a, 6c, and 6d is connected to the first sub line 32 or the second sub line 42 and description thereof is therefore omitted.

Figure 3:
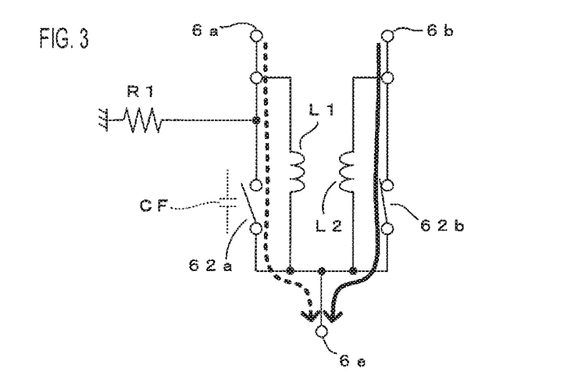
FIG. 3 is a circuit diagram for explaining improvement of isolation characteristics by adding an inductor.
Figure 4A:
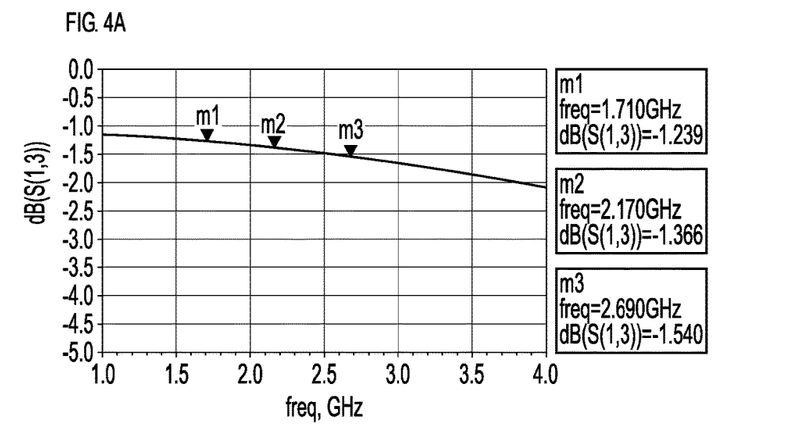
FIG. 4A is a graph illustrating the bandpass characteristics of a line at a signal output side.
Figure 5:
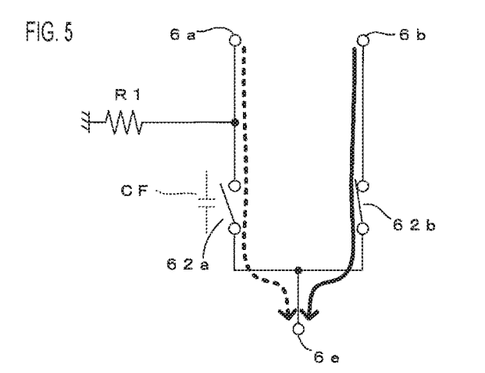
FIG. 5 is a circuit diagram for explaining a comparative example of FIG. 3.
Figure 6A:
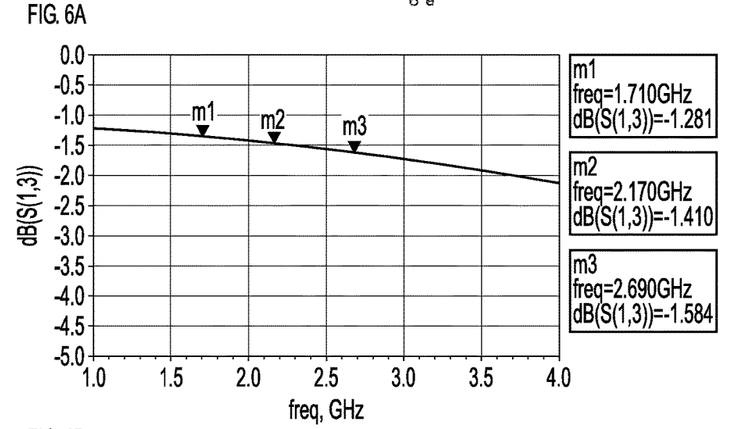
FIG. 6A is a graph illustrating the bandpass characteristics of a line at a signal output side.

When the input terminal 6b is connected to the sub line 32 of the directional coupler 3 with a signal path indicated by a bold solid line in FIG. 3, the bandpass characteristics (insertion loss) in a line connected to the sub line 32 indicate the characteristics that are as illustrated in FIG. 4A and are substantially the same or similar to the bandpass characteristics (insertion loss) in a path connected to the sub line 32 as illustrated in FIG. 6A when the first and second inductors L1 and L2 are not provided as illustrated in FIG. 5. As described above, the second inductor L2 produces less adverse influence on the insertion loss in the signal path connected to the sub line 32. It should be noted that in the present preferred embodiment, the center frequency in the frequency band of the communication signal passing through the main line 32 is preferably about 2.17 GHz, for example.

Figure 4B:
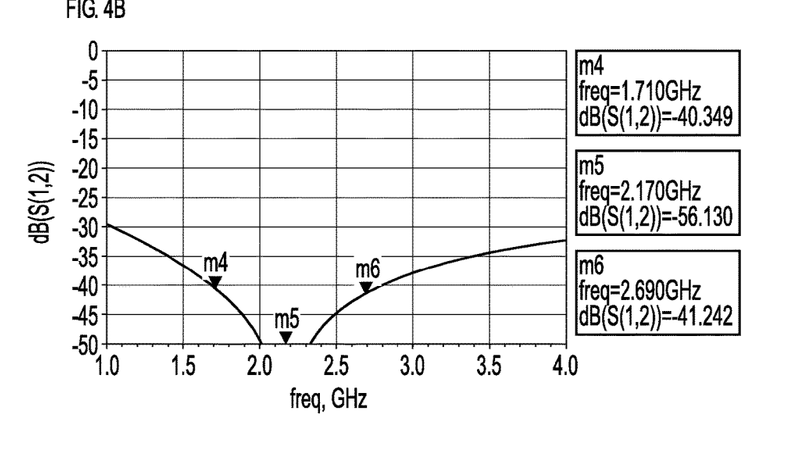
FIG. 4B is a graph illustrating the bandpass characteristics of a line at an isolation side.
Figure 6B:
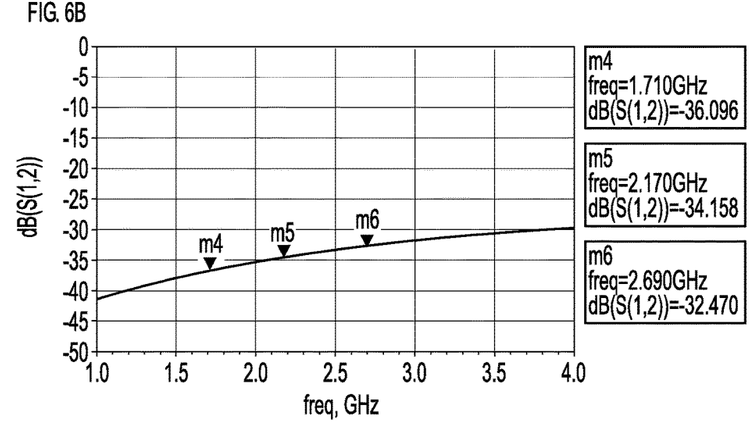
FIG. 6B is a graph illustrating the bandpass characteristics of a line at an isolation side.

On the other hand, the bandpass characteristics in a path that is not connected to the sub line 32 as indicated by a bold dashed line in FIG. 3 indicate the characteristics as illustrated in FIG. 4B because the off capacitance Cf of the switch 62a (directivity switching switch unit 62) and the first inductor L1 illustrated in FIG. 3 define an LC parallel resonance circuit. In the present preferred embodiment, the center frequency in the frequency band of the signal passing through the main line 31 is preferably about 2.17 GHz, for example. Therefore, a value of the inductor L1 is selected such that the resonant frequency of the LC parallel resonance circuit is preferably about 2.17 GHz, for example. In comparison with the bandpass characteristics of approximately −34 dB (about 2.17 GHz) in a line that is not connected to the sub line 32 as illustrated in FIG. 6B when the first and second inductors L1 and L2 are not provided as illustrated in FIG. 5, the bandpass characteristics in the path that is not connected to the sub line 32 in FIG. 3 are improved to approximately −56 dB, for example. As described above, the addition of the first and second inductors L1 and L2 reduces or prevents leakage of the signal to the path that is not connected to the sub line 32 without deteriorating the insertion loss in the path that is connected to the sub line 32 in the frequency band of the signal passing through the main line 31, so as to improve the isolation characteristics between the first input terminal 6a and the second input terminal 6b.

How the isolation characteristics between the first input terminal 6a and the second input terminal 6b of the switch IC 6 are improved by adding the first capacitor C1 will be described with reference to FIG. 7 to FIG. 10B. The transverse axis in each of FIGS. 8A and 8B and FIGS. 10A and 10B indicates frequency (GHz) and the longitudinal axis therein indicates passage loss (dB). In each of FIGS. 8A and 8B and FIGS. 10A and 10B, the output terminal 6e corresponds to the first port, the input terminal 6b corresponds to the second port, and the input terminal 6a corresponds to the third port. Although the case in which the input terminal 6a is connected to the sub line 32 of the directional coupler 3 is described as an example, the same or similar effects as those which will be described below are also provided in the case in which any one of the input terminals 6b to 6d is connected to the first sub line 32 or the second sub line 42 and description thereof is therefore omitted.

Figure 7:
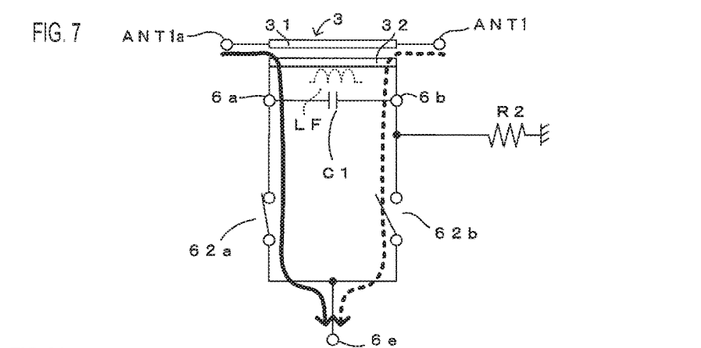
FIG. 7 is a circuit diagram for explaining improvement of the isolation characteristics by adding a capacitor.
Figure 8A:
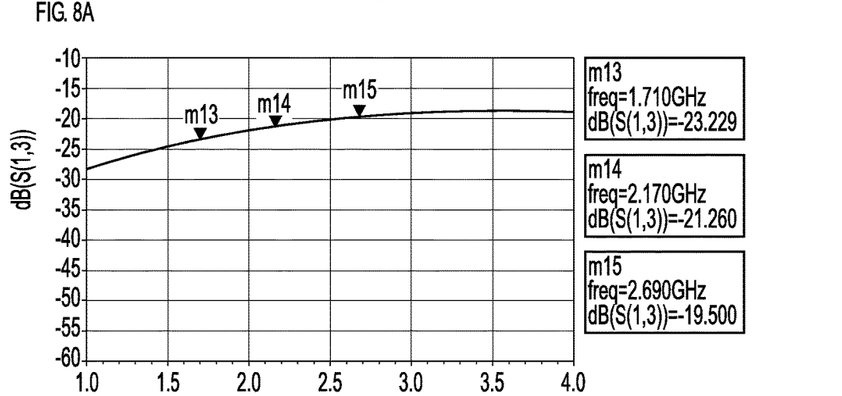
FIG. 8A is a graph illustrating the bandpass characteristics of a line at a signal output side.
Figure 9:
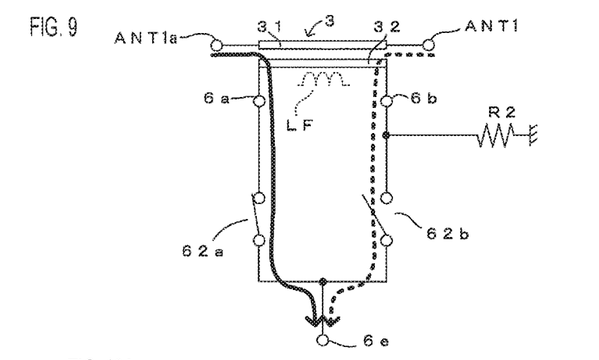
FIG. 9 is a circuit diagram for explaining a comparative example of FIG. 7.
Figure 10A:
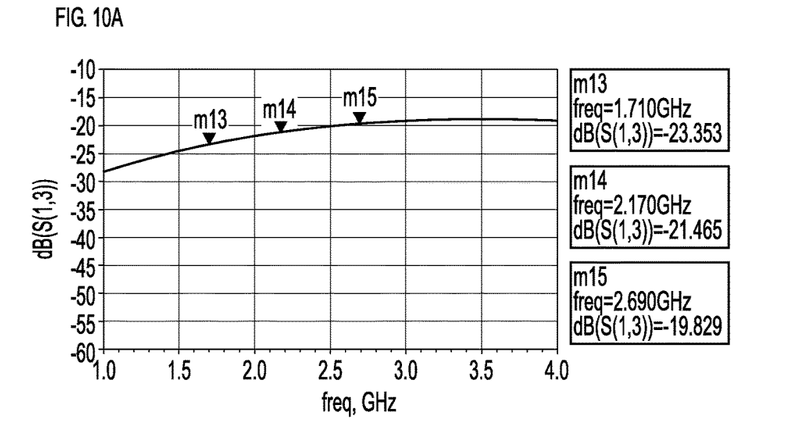
FIG. 10A is a graph illustrating the bandpass characteristics of a line at a signal output side.

When the input terminal 6a is connected to the sub line of the directional coupler 3 as illustrated in FIG. 7, the bandpass characteristics (insertion loss) in a path connected to the sub line 32 as indicated by a bold solid line in FIG. 7 indicate the characteristics that are as illustrated in FIG. 8A and are substantially the same or similar to the bandpass characteristics (insertion loss) in a path at the coupling side as illustrated in FIG. 10A when the first capacitor C1 is not provided as illustrated in FIG. 9. As described above, the first capacitor C1 produces less adverse influence on the insertion loss in the path connected to the sub line 32.

Figure 8B:
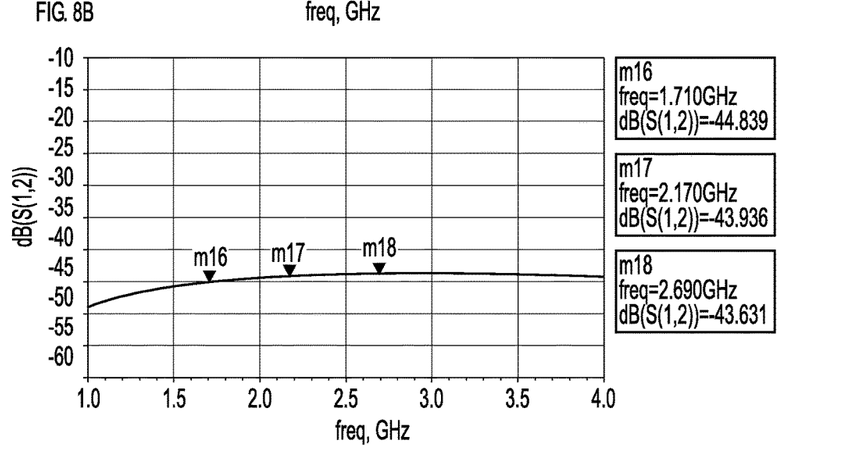
FIG. 8B is a graph illustrating the bandpass characteristics of a line at an isolation side.
Figure 10B:
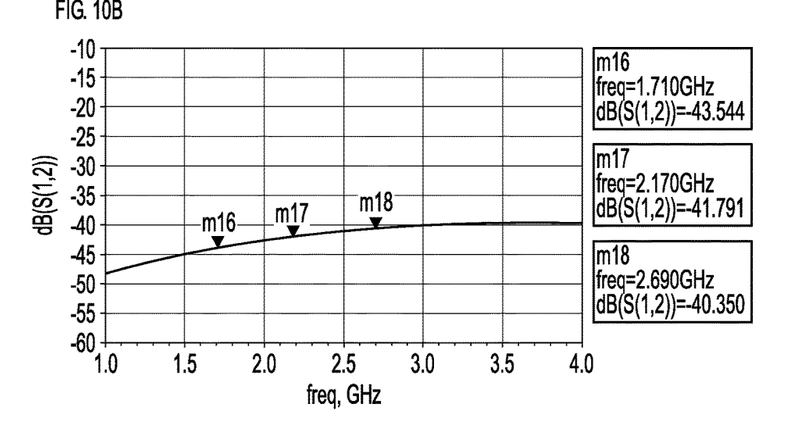
FIG. 10B is a graph illustrating the bandpass characteristics of a line at an isolation side.

On the other hand, the bandpass characteristics (isolation characteristics) in a path that is not connected to the sub line 32 as indicated by a bold dashed line in FIG. 7 indicate the characteristics as illustrated in FIG. 8B because a parasitic inductance component Lf of the sub line 32 and the first capacitor C1 illustrated in FIG. 7 define an LC parallel resonance circuit. In comparison with the isolation characteristics of approximately −40 dB in a path that is not connected to the sub line 32 as illustrated in FIG. 10B when the first capacitor C1 is not provided as illustrated in FIG. 9, the isolation characteristics in the line at the isolation side in FIG. 7 are improved to approximately −43 dB, for example. As described above, the addition of the first capacitor C1 improves the isolation characteristics without deteriorating the insertion loss in the path that is connected to the sub line 32.

As described above, the directivity of the coupled output in the first sub line 32 of the first directional coupler 3 provided in the first signal path SL1 or the second sub line 42 of the second directional coupler 4 provided in the second signal path SL2 is able to be switched, so as to detect a high-frequency signal passing through each of the first and second signal paths SL1 and SL2 in both directions.

When the coupled output in the first sub line 32 is input to the second input terminal 6b from the other end portion 32b, any one of the first termination resistors R11 to R13 with an optimum resistance value is connected to the one end portion 32a of the sub line 32 with the first input terminal 6a interposed therebetween in accordance with the frequency band of the high-frequency signal as a detection target, the high-frequency circuit that are connected to the first signal path SL1, and the fluctuation of the load. When the coupled output in the first sub line 32 is input to the first input terminal 6a from the one end portion 32a, any one of the second termination resistors R21 to R23 with an optimum resistance value is connected to the other end portion 32b of the sub line 32 with the second input terminal 6b interposed therebetween. With this configuration, mismatching in the impedance between the end portion of the sub line and the directivity switching switch unit 62 is improved and the isolation characteristics of the first directional coupler 3 are improved, so as to improve the directivity. The detection accuracy of the high-frequency signal in the first directional coupler 3 is therefore improved.

In the same or similar manner, the third termination resistors R3 connected to the third input terminal 6c (the end portion 42a of the second sub line 42) or the fourth termination resistors R4 connected to the fourth input terminal 6d (the other end portion 42b of the second sub line 42) are switched. With this configuration, mismatching in the impedance between the end portion of the second sub line 42 and the directivity switching switch unit 62 is improved and the directivity of the second directional coupler 4 is improved, so as to improve the isolation characteristics. The detection accuracy of the high-frequency signal in the second directional coupler 4 is therefore improved.

Moreover, when the coupled output in the first sub line 32 is input to the second input terminal 6b from the other end portion 32b, the first inductor L1 and the off capacitance Cf of the switch 62a define the LC parallel resonance circuit between the first input terminal 6a and the output terminal 6e. By setting the inductance of the first inductor L1 such that the resonant frequency of the LC parallel resonance circuit is a frequency at which the isolation characteristics are desired to be improved, a signal input from the second input terminal 6b is able to be prevented from coming around to the first input terminal 6a side. When the coupled output in the first sub line 32 is input to the first input terminal 6a from the one end portion 32a, the second inductor L2 and the off capacitance Cf of the switch 62b define the LC parallel resonance circuit between the second input terminal 6b and the output terminal 6e. Therefore, by setting the inductance of the second inductor L2 in the same or similar manner as for the first inductor L1, a signal input from the first input terminal 6a is prevented from coming around to the second input terminal 6b side. As described above, the isolation characteristics between the first input terminal 6a and the second input terminal 6b are able to be improved by arranging the inductor L1 in parallel with the path connecting the first input terminal 6a and the output terminal 6e and arranging the inductor L2 in parallel with the path connecting the second input terminal 6b and the output terminal 6e.

Furthermore, by setting the inductances of the third inductor L3 and fourth inductor L4 in the same or similar manner as for the first and second inductors L1 and L2, the isolation characteristics between the third input terminal 6c and the fourth input terminal 6d are able to be improved.

The parasitic inductance component in the first sub line 32 and the first capacitor C1 connected to the first sub line 32 in parallel define the LC parallel resonance circuit between the first input terminal 6a and the second input terminal 6b. By setting the shape of the first sub line 32, such as the line length and the width thereof, and the capacitance of the first capacitor C1 such that the resonant frequency of the LC parallel resonance circuit is a frequency at which the isolation characteristics are desired to be improved, the isolation characteristics between the first input terminal 6a and the second input terminal 6b at a desired frequency are able to be improved. Moreover, in the same or similar manner, by setting the shape of the second sub line 42, such as the line length and the width thereof, and the capacitance of the second capacitor C2, the isolation characteristics between the third input terminal 6c and the fourth input terminal 6d at a desired frequency are able to be improved.

When the plurality of first to fourth termination resistors are provided in the switch IC 6, a circuit that switches the directivities of the first and second directional couplers 3 and 4 is easily provided only by mounting the switch IC 6 on the multilayer substrate 2. In addition, the high-frequency module 1 is able to be reduced in size and the characteristics of the first and second directional couplers 3 and 4 are able to be made stable.

Furthermore, the first connection wiring 10a and the second connection wiring 10b are respectively provided on the different insulating layers 2d and 2f. Therefore, electromagnetic coupling between the first connection wiring 10a and the second connection wiring 10b is reduced or prevented, so as to improve the isolation characteristics between the first input terminal 6a and the second input terminal 6b. In the same or similar manner, the third connection wiring 10c and the fourth connection wiring 10d are respectively provided on the different insulating layers. Therefore, electromagnetic coupling between the third connection wiring 10c and the fourth connection wiring 10d is reduced or prevented, so as to improve the isolation characteristics between the third input terminal 6c and the fourth input terminal 6d.

Second Preferred Embodiment

A second preferred embodiment of the present invention will be described with reference to FIG. 11. The high-frequency module 1 in the second preferred embodiment is different from the above-described first preferred embodiment in that the first to fourth termination resistors are preferably defined by chip components 11 mounted on the multilayer substrate 2 as illustrated in FIG. 11. Moreover, the first directional coupler 3 is preferably defined by a surface mount device 12 mounted on the multilayer substrate 2 and the second directional coupler 4 is preferably defined by a surface mount device 13 mounted on the multilayer substrate 2. Other configurations and operations are the same or similar as those in the above-described first preferred embodiment and explanation of the configurations and operations thereof are omitted by applying the same reference numerals.

With this configuration, the resistance values of the first to fourth termination resistors are able to be easily changed only by replacing the chip components 11, so as to increase the change ranges of the resistance values. Furthermore, the first and second directional couplers 3 and 4 are mounted on the main surface of the multilayer substrate 2. Therefore, the isolation characteristics between the directional couplers and wirings and other circuit elements incorporated in the multilayer substrate are able to be improved in comparison with the configuration in which the first and second directional couplers 3 and 4 are incorporated in the multilayer substrate.

It should be noted that the present invention is not limited to the above-described preferred embodiments. In addition to the above-described preferred embodiments, various changes may be made without departing from the gist thereof and the above-described configurations may be combined in any manner. For example, the numbers of circuit elements, such as the first to fourth termination resistors and the directional couplers 3 and 4 are not limited to the above-described numbers and it is sufficient that the necessary numbers of circuit elements are provided in accordance with the number of communication systems and the number of antennas A1 and A2 included in the communication apparatus. Although each of the first to fourth termination resistors is preferably defined by the circuit including three resistors in the preferred embodiments, each of the resistor switching switch units 63a to 63d may select one of the three resistors or equal to or more than two resistors at the same time. This configuration is able to increase the selection ranges of the termination resistors.

The first and second directional couplers 3 and 4 and the switch IC 6 may preferably be integrally defined by a surface mount device. For example, providing the first and second directional couplers 3 and 4 on the semiconductor substrate of the switch IC 6 reduces the areas occupied by the directional couplers and the switch IC and reduces the high-frequency module in size.

Although in the above-described preferred embodiments, the directivity switching switch unit 62 and the first to fourth resistor switching switch units 63a to 63d are preferably primarily defined by the electric field effect transistors, they may include various switching elements, such as a PIN diode, a bipolar transistor, and an electrostatic induction-type transistor, for example.

The antennas that are connected to the switch IC 5 are not limited to the above-described antennas A1 and A2 for multiple bands and a plurality of antennas for single bands corresponding to the respective bands that are used in the used communication systems may preferably be connected to the switch IC 5. It is sufficient that the numbers of antennas and communication systems which are connected to the switch IC are appropriately set to optimum numbers in accordance with the configuration of the communication apparatus on which the high-frequency module 1 is mounted.

Preferred embodiments of the present invention can be widely applied to high-frequency modules including a high-frequency circuit in which a directional coupler that detects a high-frequency signal transmitted through a signal path is provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module comprising:
   a first directional coupler including a first main line located in a first signal path and a first sub line which is electromagnetically coupled to the first main line; and
   a switch unit that switches directivity of coupled output in the first sub line; wherein
   the switch unit includes:
   a first input terminal which is connected to one end portion of the first sub line;
   a second input terminal which is coupled to another end portion of the first sub line;
   an output terminal from which the coupled output that is input to the first input terminal or the second input terminal in the first line is output;
   a directivity switching switch unit which connects one of the first input terminal and the output terminal in a switching manner;
   a first termination resistor which is connected to the first input terminal in parallel;
   a second termination resistor which is connected to the second input terminal in parallel;
   a first resistor switching switch unit which connects the first termination resistor to the first input terminal when the directivity switching switch unit connects the second input terminal to the output terminal; and a second resistor switching switch unit which connects the second termination resistor to the second input terminal when the directivity switching switch unit connects the first input terminal to the output terminal; and a variable capacitance is connected between the first input terminal and a ground and/or the second input terminal and a ground.

2. The high-frequency module according to claim 1, wherein the switch unit further includes:
   a first inductor which is connected between the first input terminal and the output terminal; and
   a second inductor which is connected between the second input terminal and the output terminal.

3. The high-frequency module according to claim 2, wherein
   the switch unit includes a switch IC; and
   at least one of the first inductor and the second inductor is provided in the switch IC.

4. The high-frequency module according to claim 3, wherein
   the high-frequency module switches between two states including a state in which at least one of the first inductor and the second inductor is connected between the directivity switching switch unit and the output terminal, and a state in which at least one of the first inductor and the second inductor is not connected between the directivity switching switch unit and the output terminal.

5. The high-frequency module according to claim 3, wherein an inductance value of at least one of the first inductor and the second inductor is variable.

6. The high-frequency module according to claim 1, wherein the switch unit further includes a capacitor which is connected between the first input terminal and the second input terminal.

7. The high-frequency module according to claim 6, wherein
   the switch unit includes a switch IC; and
   the capacitor is provided in the switch IC.

8. The high-frequency module according to claim 7, wherein the high-frequency module switches between two states including a state in which the capacitor is connected between the first input terminal and the second input terminal, and a state in which the capacitor is not connected between the first input terminal and the second input terminal.

9. The high-frequency module according to claim 7, wherein a capacitance value of the capacitor is variable.

10. The high-frequency module according to claim 9, wherein the capacitance value is made variable by selectively connecting at least one of a plurality of capacitors to the first input terminal and the second input terminal.

11. The high-frequency module according to claim 1, further comprising:
    a multilayer substrate that includes a plurality of insulating layers that are laminated and in which the first directional coupler and the switch unit are provided; wherein
    the switch unit includes a switch IC mounted on the multilayer substrate; and
    the first termination resistor and the second termination resistor are provided in the switch IC.

12. The high-frequency module according to claim 11, further comprising:
    a wiring electrode provided on and/or in the multilayer substrate; wherein
    at least one portion of the wiring electrode defines an inductor.

13. The high-frequency module according to claim 11, further comprising:
    a wiring electrode provided on and/or in the multilayer substrate; wherein
    at least one portion of the wiring electrode defines a capacitor.

14. The high-frequency module according to claim 1, further comprising:
    a multilayer substrate that includes a plurality of insulating layers that are laminated and in which the first directional coupler and the switch unit are provided; wherein
    the switch unit includes a switch IC mounted on the multilayer substrate; and
    the first termination resistor and the second termination resistor include chip components mounted on the multilayer substrate.

15. The high-frequency module according to claim 1, wherein at least one of the directivity switching switch unit, the first resistor switching switch unit, and the second resistor switching switch unit is defined by at least one of an inductor, a capacitor, and a resistor connected to an electric field effect transistor.

16. The high-frequency module according to claim 15, at least one of the directivity switching switch unit, the first resistor switching switch unit, and the second resistor switching switch unit includes a capacitance value.

17. The high-frequency module according to claim 16, wherein the capacitance value is an off capacitance of the electrical field effect transistor.

18. The high-frequency module according to claim 16, wherein the capacitance value is a capacitance of the capacitor connected to the electrical field effect transistor.

19. The high-frequency module according to claim 16, wherein the capacitance value is variable by selectively connecting at least one of a plurality of electrical field effect transistors to the first input terminal.

20. The high-frequency module according to claim 1, wherein
    a plurality of first termination resistors including the first termination resistor and a plurality of second termination resistors including the second termination resistor are provided;
    the first resistor switching switch unit connects at least one of the plurality of first termination resistors to the first input terminal; and
    the second resistor switching switch unit connects at least one of the plurality of second termination resistors to the second input terminal.

* * * * *